United States Patent
Doyle et al.

(10) Patent No.: US 10,217,270 B2
(45) Date of Patent: Feb. 26, 2019

(54) SCALABLE GEOMETRY PROCESSING WITHIN A CHECKERBOARD MULTI-GPU CONFIGURATION

(71) Applicant: INTEL CORPORATION, Santa Clara, CA (US)

(72) Inventors: Peter L. Doyle, El Dorado Hills, CA (US); Jeffery S. Boles, Folsom, CA (US); Arthur D. Hunter, Jr., Cameron Park, CA (US); Altug Koker, El Dorado Hills, CA (US); Aditya Navale, Folsom, CA (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 15/445,852

(22) Filed: Feb. 28, 2017

(65) Prior Publication Data
US 2017/0169539 A1 Jun. 15, 2017

Related U.S. Application Data (63) Continuation of application No. 13/976,843, filed as application No. PCT/US2011/061447 on Nov. 18, 2011, now Pat. No. 9,619,855.

(51) Int. Cl.
*G06T 15/10* (2011.01)
*G06T 15/00* (2011.01)
*G06T 11/40* (2006.01)

(52) U.S. Cl.
CPC ............. *G06T 15/10* (2013.01); *G06T 11/40* (2013.01); *G06T 15/005* (2013.01); *G06T 2210/52* (2013.01)

(58) Field of Classification Search
None
See application file for complete search history.

(56) References Cited

U.S. PATENT DOCUMENTS

| 6,222,550 | B1 | 4/2001 | Rosman et al. |
| 7,616,206 | B1 | 11/2009 | Danilak |
| 7,830,391 | B2 | 11/2010 | Champion et al. |

(Continued)

FOREIGN PATENT DOCUMENTS

| CN | 1571991 | 1/2005 |
| CN | 1643545 | 7/2005 |

(Continued)

OTHER PUBLICATIONS

USPTO Nonfinal Rejection in U.S. Appl. No. 15/445,852, dated Apr. 7, 2017, 19 pages.

(Continued)

*Primary Examiner* — Peter Hoang (57) ABSTRACT

Systems, apparatus and methods are described including distributing batches of geometric objects to a multi-core system, at each processor core, performing vertex processing and geometry setup processing on the corresponding batch of geometric objects, storing the vertex processing results shared memory accessible to all of the cores, and storing the geometry setup processing results in local storage. Each particular core may then perform rasterization using geometry setup results obtained from local storage within the particular core and from local storage of at least one of the other processor cores.

25 Claims, 5 Drawing Sheets

(56) References Cited

U.S. PATENT DOCUMENTS

| | | | |
|---|---|---|---|
| 7,834,880 B2 | 11/2010 | Bakalash et al. | |
| 8,711,156 B1* | 4/2014 | Acocella | G06F 12/1063 345/506 |
| 9,619,855 B2 | 4/2017 | Doyle et al. | |
| 2003/0142100 A1 | 7/2003 | Lavelle et al. | |
| 2003/0169269 A1* | 9/2003 | Sasaki | G06F 9/5066 345/581 |
| 2008/0074430 A1 | 3/2008 | Jiao et al. | |
| 2008/0201537 A1* | 8/2008 | Burchard | G06F 13/1673 711/154 |
| 2009/0174706 A1* | 7/2009 | Howson | G06T 1/20 345/419 |
| 2011/0057942 A1 | 3/2011 | Mantor et al. | |
| 2011/0080404 A1* | 4/2011 | Rhoades | G06T 15/005 345/423 |
| 2012/0017062 A1 | 1/2012 | Goel et al. | |

FOREIGN PATENT DOCUMENTS

| | | |
|---|---|---|
| WO | WO 2008/079984 A1 | 7/2008 |
| WO | WO 2013/074124 A1 | 5/2013 |

OTHER PUBLICATIONS

Ellsworth, "A New Algorithm for Interactive Graphics on Multi-computers", pp. 33-40, Jul. 1994.

Molnar, et al., "PixelFlow: High-Speed Rendering Using Image Composition", Appeared in proceedings of Siggraph 92, Computer Graphics, 26, pp. 231-140, Jul. 2, 1992.

Mueller, "The Sort-First Rendering Architecture for High-Performance Graphics", In Proceedings of the 1995 Symposium on Interactive 3D Graphics, 11 pages, 1995.

International Search Report and Written opinion for PCT Patent Application No. PCT/US2011/061447, dated Jul. 31, 2012, 10 Pages.

Segal, et al., "The OpenGL® Graphics System: A Specification", pp. 489, Mar. 11, 2010.

Seiler, et al., "Larrabee: A Many-Core x86 Architecture for Visual Computing", ACM Transactions on Graphics, vol. 27, No. 3, pp. 16, Aug. 2008.

Whitman, "Dynamic Load Balancing for Parallel Polygon Rendering", pp. 41-48, Jul. 1994.

International Preliminary Report on Patentability and Written Opinion received for PCT Patent Application No. PCT/US2011/061447, dated May 30, 2014, 7 Pages.

USPTO Nonfinal Rejection in U.S. Appl. No. 13/976,843, dated Jan. 15, 2016, 15 pages.

First Office Action for Chinese Patent Application No. 201180074917.0, dated Dec. 22, 2015, 7 pages.

USPTO Nonfinal Rejection in U.S. Appl. No. 13/976,843, dated Aug. 10, 2016, 23 pages.

Second Office Action for Chinese Patent Application No. 201180074917.0, dated Aug. 19, 2016, 10 pages.

USPTO Notice of Allowance in in U.S. Appl. No. 13/976,843, dated Dec. 9, 2016, 8 pages.

* cited by examiner

SCALABLE GEOMETRY PROCESSING WITHIN A CHECKERBOARD MULTI-GPU CONFIGURATION

BACKGROUND

Delivering competitive processor graphics subsystem relies on an efficient and scalable graphics architecture. Scalability is needed to support a range of graphics performance points using a single architecture and limited design resources. Parallelizing the graphics workloads across multiple identical graphics cores typically provides such scalability.

One problem inherent in the architecture of parallel graphics pipelines is efficiently parallelizing both the geometry processing and rasterization stages of the pipeline. Parallelizing both stages is desirable given that either stage can become the performance bottleneck at different times during the processing of a single frame. Unfortunately, parallelizing geometry processing most naturally requires distribution of geometric objects across the graphics cores, while parallelizing rasterization most naturally requires distribution of image space (e.g., the frame buffer) across the graphics cores. However, the correlation between geometric objects and their image space footprint is not known a priori. In addition, geometric objects need to be rasterized in the same temporal order as they are submitted for geometry processing. Therefore a mechanism needs to assemble, reorder and distribute the results of parallel geometry processing across the parallel rasterization pipelines with high performance/power and performance area characteristics, and in a fashion that does not require significant software intervention.

A conventional graphics system including multiple, parallel graphics cores and capable of distributed rasterization through use of CheckerBoard Rendering (CBR) schemes, may subdivide a target surface (e.g., the frame buffer) into small rectangular regions. Non-overlapping regular grid subsets of these regions may then be assigned to each graphics core such that all target surface pixels are assigned. Rasterization pipelines in the graphics cores may then operate parallel such that, for each rasterized object, a rasterization pipeline will render only those pixels contained within its subset of the target surface pixels. In current CBR schemes, each graphic core performs geometry processing for all submitted geometric objects, passing the results to only its internal rasterization pipeline. Because geometry processing is replicated across the graphics cores in such conventional systems, there is no positive scaling of geometry processing rate with the number of graphics cores.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

One or more embodiments or implementations are now described with reference to the enclosed figures. While specific configurations and arrangements are discussed, it should be understood that this is done for illustrative purposes only. Persons skilled in the relevant art recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information to a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every implementation may not necessarily include the particular feature, structure or characteristic. Moreover, such phrases are not necessarily referring to the same implementation. Further, when a particular feature, structure, or characteristic is described in connection with an implementation, it is submitted that it is within the knowledge of one skilled in the art to effect such feature, structure, or characteristic in connection with other implementations whether or not explicitly described herein.

Figure 1:
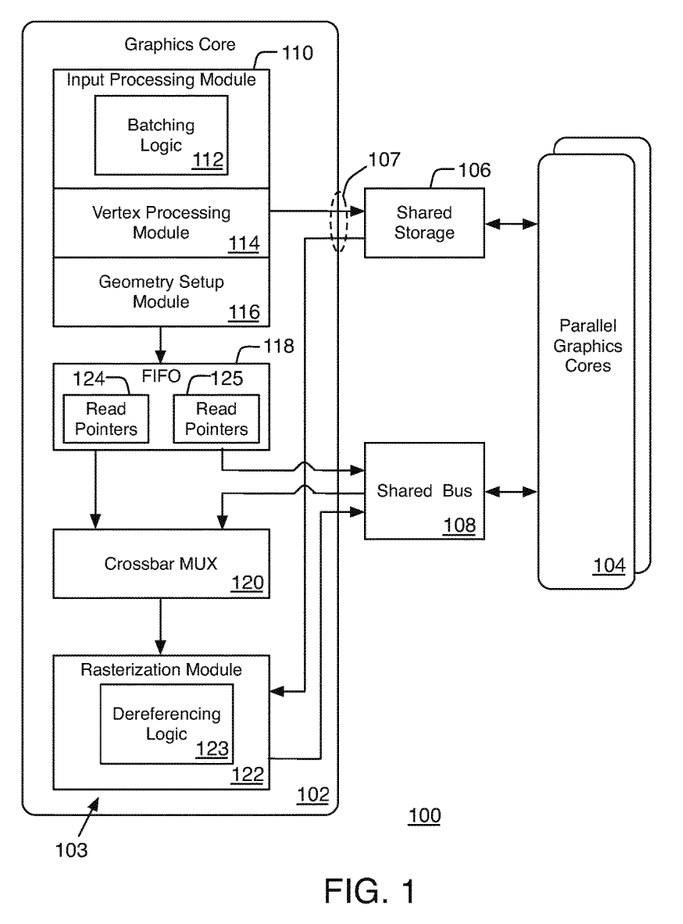
FIG. 1 is an illustrative diagram of an example graphics system.

FIG. 1 illustrates an example graphics system 100 in accordance with the present disclosure. In various implementations, system 100 includes multiple parallel graphics cores 102 and 104, shared storage 106 and a parallel shared bus 108. In various implementations, shared storage 108 may be any type of memory such as, but not limited to, Random Access Memory (RAM), Dynamic Random Access Memory (DRAM), Static RAM (SRAM), flash memory and so forth. Each of graphics cores 102 and 104 may be microprocessor cores that have been configured to undertake three-dimensional (3D) graphics processing. Further, graphics cores 102 and 104 may be similarly configured and/or structured.

In various implementations, cores 102/104 may be configured to perform 3D graphics processing according to various application programming interfaces (APIs), standards, and/or specifications, including, but not limited to, the OpenGL specification (see, e.g., "The OpenGL Graphics System: A Specification (Version 4.0 (Core Profile)—Mar. 11, 2010)), or the Direct3D API (see, e.g., "The Direct3D 10 System" ACM Transactions on Graphics (TOG)—Proceedings of ACM SIGGRAPH, Volume 25 Issue 3, July 2006") (hereinafter the "Direct3D API"). In the interest of clarity, the various devices, systems and processes are described herein in the context of the Direct3D API although the present disclosure is not limited to any particular 3D graphics APIs, standards, and/or specifications.

The internal components of graphics core 102 are illustrated in greater detail in FIG. 1 and include a 3D graphics pipeline 103 having an input processing module 110 (including batching logic 112), a vertex processing module 114 communicatively coupled to input processing module 110 and to shared storage 106, a geometry setup module 116 communicatively coupled to vertex processing module 114, a local storage structure such as a First In First Out (FIFO) buffer 118 communicatively coupled to geometry setup module 116 and to shared bus 108, a crossbar multiplexer (MUX) 120 communicatively coupled to FIFO 118 and to shared bus 108, and a rasterization module 122 (including dereferencing logic 123) communicatively coupled to crossbar MUX 120, shared storage 106, and shared bus 108. An interconnect 107 provided to each of cores 102/104 provides read and write access to shared memory 108. Each of parallel graphics cores 104 may include similar items. In various implementations, each of graphics cores 102 and 104 may be termed a graphics processing unit (GPU). Those of skill in the art may recognize that some components or modules of a 3D graphics pipeline, such as a pixel shader module, have been omitted from FIG. 1 in the interests of clarity.

Figure 2:
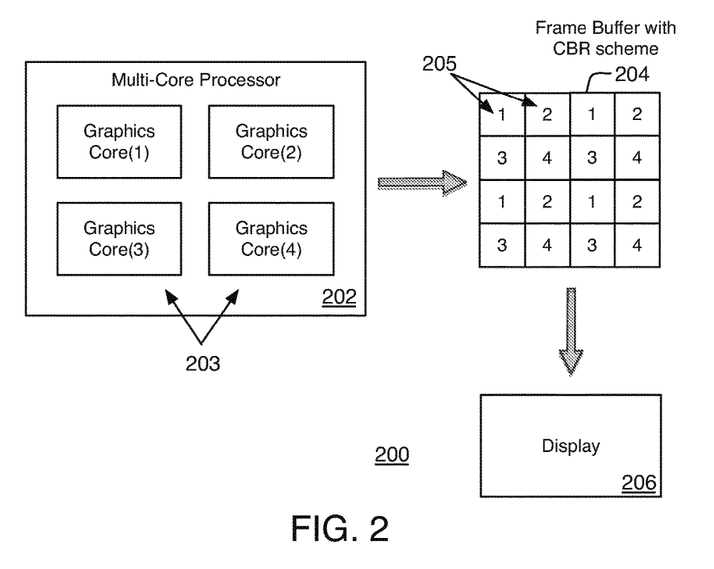
FIG. 2 illustrates an example checkerboard rendering scheme.

As we explained in greater detail below, system 100 may provide scalable geometry processing in accordance with the present disclosure where graphics cores 102 and 104 may be configured to undertake parallel rendering employing various checkerboard rasterization schemes. For instance, FIG. 2 illustrates an example CBR scheme 200 where four identical graphics cores (each similar to cores 102 and 104 of FIG. 1) of a multi-core processor 202 have been mapped to target pixels of different regions 205 of frame buffer 204 to facilitate parallel rendering. As shown in this example, core (1) will render graphics data for target pixels in, portions of frame buffer 204 labeled "1", core (2) will render graphics data for target pixels in portions of frame buffer 204 labeled "2", and so forth. Once each region 205 has been rasterized, the contents of frame buffer 204 may be subjected to additional processing such as pixel shading, output merging and so forth prior to being provided for display on a display 206.

While the example scheme total of four graphics cores 203 assigned to specific target pixel regions 205, the present disclosure is not limited to any particular number or types of graphics processing cores and/or to any particular parallel rendering schemes. For example, any of various known CBR schemes for apportioning rendering of target pixels of a frame buffer may be employed (see, e.g., Carl Mueller, "The Sort-First Rendering Architecture for High-Performance Graphics", In Proceedings of the 1995 Symposium on Interactive 3D Graphics, pages 75-84 (1995)). Further, the present disclosure is not limited to any sizes and/or arrangements of regions 205. Thus, for example, each of regions 205 may correspond to a 64×64-pixel region of buffer 204, a 128×128-pixel region of buffer 204, and so forth. In addition, frame buffer 204 may have any pixel resolution or format and is not limited to a square format as illustrated. For example, frame buffer 204 may have various high-definition (HD) resolutions such as 1280×720 pixels, or 1920×1080 pixels and so forth.

In accordance with the present disclosure, as will be explained in greater detail below, when processor 102 undertakes 3D graphics processing of a scene, each of the graphics cores may perform vertex and geometry processing on separate batches of graphics objects associated with the various target pixels assigned to the respective cores. For example, core (1) may perform vertex and geometry processing on graphics objects that span target pixels from regions 205 of frame buffer 204 labeled "1", core (2) may perform vertex and geometry processing on graphics objects that span target pixels from regions 205 labeled "2", and so forth.

Referring again to FIG. 1, in accordance with the present disclosure and as will also be explained in greater detail below, input processing module 110 may receive graphics data (e.g., primitives corresponding to triangles, line and points) corresponding to graphics objects and each of graphics cores 102 and 104 may use batching logic 112 to select the graphics data corresponding to various batches of graphics objects. Batching logic 112 in each core may act to subdivide, apportion or distribute incoming geometric objects into batches of consecutive objects provided to cores 102/104, and each graphics core may process its separate corresponding batches on a round-robin basis. In various implementations, batch sizes may be programmable and may vary by input topology.

In accordance with the present disclosure, each core may then, in parallel with the other cores, use module 114 to undertake vertex processing of vertices of the assigned objects and may store the vertex processing results in shared storage 106. The vertex processing may include various known functions such as vertex shading, tessellation, geometry shading, and the like. Thus, in accordance with the present disclosure, rather than copying each per-vertex result to all cores 102 and 104, the vertex processing results may be written to shared storage 106 by each core as it completes vertex processing, and may be later read from shared storage 106 by only those cores that need vertex processing results for a particular object when undertaking rasterization.

In accordance with the present disclosure, each core may then, in parallel with the other cores, use module 116 to undertake geometry setup processing of the assigned objects and may store the geometry setup results in FIFO 118. The geometry setup processing may operate on entire primitives and may include various known functions such as "culling" subfunctions including trivial rejection against clip boundaries, back-face culling, degenerate and zero-pixel object culling, and the like. As those of skill in the art may recognize, a large percentage of the geometry workload may be discarded during geometry setup. For example, primitives corresponding to entire batches of objects may be discarded as a result of geometry setup processing. Considering that each graphics core performs geometry setup processing (for different batches) in parallel, for cases where batches are discarded, system 100 may exhibit near-linear scaling for geometry processing.

The results of the geometry setup processing include determining which rasterization pipeline(s) each object spans based on the particular CBR scheme employed. This information, along with the results of the other setup subfunctions needed for rasterization, may be written to each graphics core's FIFO 118. Further, control information specifying batch demarcation may also be stored in FIFO 118.

In various implementations, FIFO 118 may be any type of FIFO data structure. Thus, in various non-limiting examples, FIFO 118 may be provided by data structures including but not limited to SRAM, flip-flops, latches or any other suitable form of storage structure. Further, FIFO 118 may include multiple sets of read and write pointers, as well as storage and control logic. For instance, as will be described in greater detail below, in various implementations, FIFO 118 may be a multi-port SRAM including two sets of read pointers: one set of read pointers 124 associated with internal objects, and one set of read pointers 125 associated with external objects.

In accordance with the present disclosure, using batch demarcation information received from all FIFOs 118 and subsequently transmitted over shared bus 108, the graphics cores may take turns submitting batch processing results for rasterization. When a specific graphics core takes its turn, its MUX 120 may select that core's internal objects from FIFO 118 for rasterization using module 122 while simultaneously outputting external objects within the batch from FIFO 118 over shared bus 108. The other graphics cores may select shared bus 118 as input to their rasterization modules 122. Once all objects (if any) for a current batch have been removed from FIFO 118 as a given core performs rasterization, that graphics core may signal batch demarcation over shared bus 108 and may then switch its MUX 120 to input external objects received from the other graphics core(s) over shared bus 108.

During rasterization, each graphics cores' rasterization module 122 may access vertex processing results by reading from shared storage 106 as needed. As vertex processing results are consumed by a given core, that core's rasterization module 122 may use dereferencing logic 123 to transmit dereference information back over shared bus 108 to the graphics core that generated the particular vertex processing results used in the rasterization. In this manner, batches of objects may be rasterized by system 100 in temporal order in a round-robin fashion.

Figure 3:
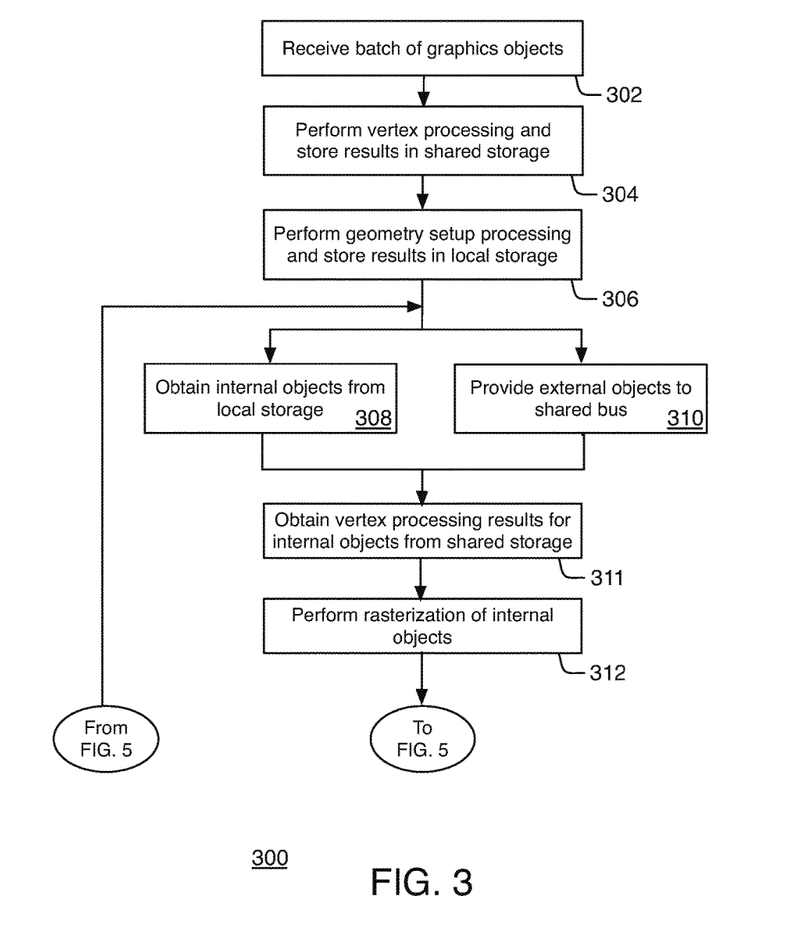
FIGS. 3 and 5 illustrate a flow chart of an example parallel rendering process.
Figure 5:
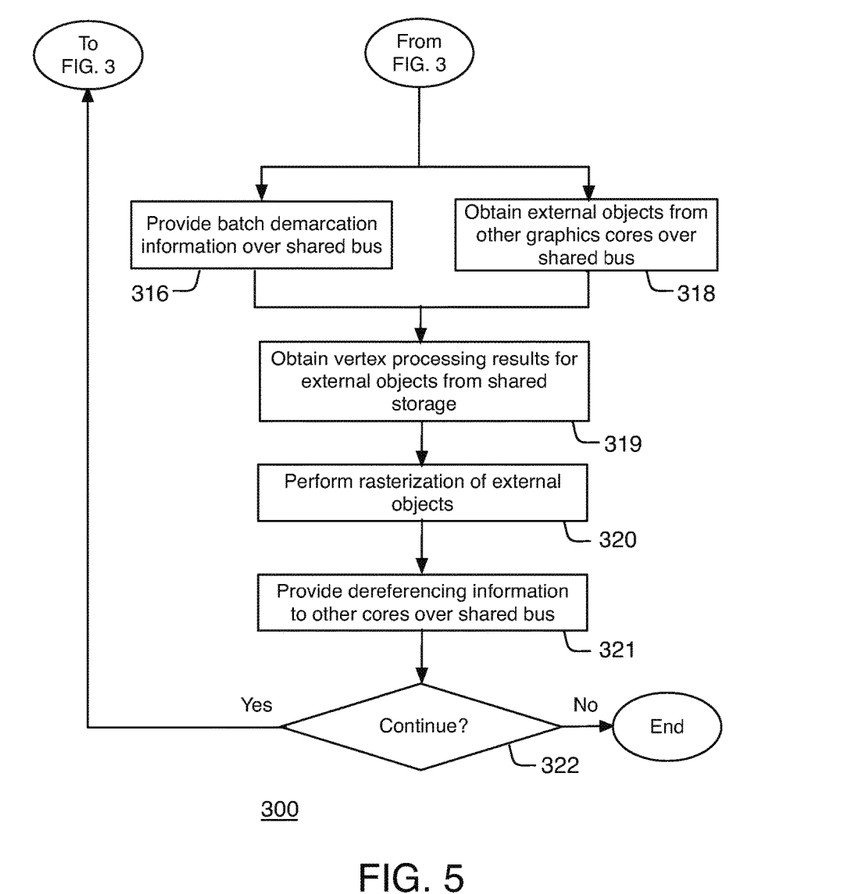

FIGS. 3 and 5 illustrate a flow diagram of an example process 300 for parallel rendering according to various implementations of the present disclosure. Process 300 may include one or more operations, functions or actions as illustrated by one or more of blocks 302-322 of FIGS. 3 and 5. By way of non-limiting example, process 300 will be described herein with reference to example graphics system 100 of FIG. 1 and example CBR scheme 200 of FIG. 2.

Process 300 may begin at block 302 where a graphics core may receive a batch of graphics objects. For example, in various implementations, core 102 may receive a batch of graphics objects at input processing module 110 where botching logic 112 may determine, from an input list of graphics objects (e.g., an input list of point primitives, line primitives, and so forth), those objects to be apportioned to core 102. For example, graphics core(1) may receive a batch of graphics objects at block 302 where the locations of the objects in terms of target surface (e.g., frame buffer) pixel locations lie, at least in part, within at least one of the regions 205 labeled (1) in frame buffer 204. Input processing module 110 may then provide primitives of the corresponding batch, of objects to vertex processing module 114.

At block 304, vertex processing may be performed on the object primitives and the results may be stored in shared storage. For example, in various implementations, core 102 may use vertex processing module 114 to undertake vertex processing operations such as vertex shading, tessellation, geometry shading, and the like. The resulting per-vertex primitive data (such as intensity, color, depth, transparency and so forth) may be stored in shared storage 108 where it may be accessed by any of cores 102/104.

At block 306, geometry setup processing may be performed on the object primitives and the results may be stored in local storage. For example, in various implementations, core 102 may use geometry setup module 116 to undertake geometry setup operations such as trivial rejection against clip boundaries, back-face culling, degenerate and zero-pixel object culling, and the like. In addition, processing at block 306 also includes the determination of which rasterization pipeline(s) each object spans based on the checkerboard subdivision of the render target (e.g., information that may be used to determine which graphics cores 102/104 will be involved in rasterizing a given object). This batch control information, along with the results of the other setup subfunctions needed for rasterization, may be written to a FIFO 118. For instance, in accordance with the present disclosure, geometry setup module 116 may store batch information in FIFO 118 where the batch information classifies primitives by render target location (e.g., by which CBR region the data is associated with).

In various implementations, as a result of undertaking block 306, FIFO 118 may receive geometry setup results and batch control information that specifies how the corresponding objects map onto frame buffer locations. In this respect, graphics objects that map only to frame buffer locations associated with or assigned to the core undertaking process 300 may be designated as internal objects, while graphics objects that map to frame buffer locations that are not associated with or assigned to the core undertaking process 300 may be designated as external objects. In various implementations, a graphics object may be designated under both categories.

Figure 4:
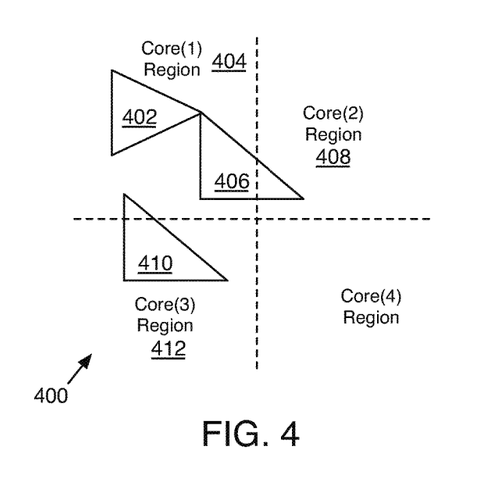
FIG. 4 illustrates a portion of the example of FIG. 3.

For example, FIG. 4 illustrates a portion 400 of frame buffer 204 of FIG. 2 in greater detail where, as a result of block 302, two objects 402 and 406 have been included in a batch of objects to be processed by core(1) of processor 202 at blocks 304 and 306. In this example, object 402 spans only frame buffer pixel position residing entirely within a region 404 assigned to core(1) and therefore batch control information may specify object 402 as an internal object when core (1) undertakes block 306 for region 404. By contrast, object 406 spans pixel positions within region 404 assigned to core(1) as well as in region 408 assigned to core(2). Therefore control information may specify object 402 as both an internal object and as an external object when core (1) undertakes block 306 for region 404. In various implementations, FIFO 118 includes two sets of read pointers, one set of pointers 124 for internal objects spanning target pixels allocated to the particular graphics core undertaking process 300, and a second set of read pointers 125 for external objects spanning target pixels allocated to other graphics core(s) in the subsystem.

In various implementations, blocks 302-306 may be undertaken in parallel by all graphics cores. For example, blocks 302-306 may be undertaken in parallel by cores 203 of processor 202 using objects apportioned among cores by batching logic. As a result, vertex processing results corresponding to all pixel locations of frame buffer may be stored in shared storage 108 while geometry setup results for internal and external objects may be stored in the respective FIFOs of cores 203.

Process 300 may continue at block 308 where internal object setup results may be obtained from local storage, and at block 310 where external object setup results may be provided to other graphics cores over the shared bus. In various examples, block 308 may involve core 102 using MUX 120 and the control information stored in FIFO 118 to obtain data for internal objects from FIFO 118 and provide that data to rasterization module 122, while block 310 may involve core 102 using the control information stored in FIFO 118 to identify external objects and may then provide data for those external objects to cores 104 over shared bus 108. At block 311, vertex processing results for the internal objects may be obtained from shared storage. For instance, in various implementations, block 308 may involve core 102 obtaining vertex processing results for the internal objects from shared storage 106 using interconnect 107.

At block 312, rasterization of the internal objects may be performed. For example, core 102 may use rasterization module 122 to rasterize the internal objects within its assigned target pixel regions using well-known rasterization techniques. Process 300 may then continue at blocks 316 and 318 of FIG. 5.

At block 316, batch demarcation information may be provided over the shared bus. For example, having rasterized all internal objects, core 102 may use FIFO 118 to signal batch demarcation to cores 104 using shared bus 108. At block 318, external objects may be obtained from other graphics cores over the shared bus. For example, core 102 may use shared bus 108 to obtain geometry setup results for external objects from various ones of cores 104. For instance, referring again to the example of FIG. 4, block 318 may involve core(1) obtaining it pertaining to object 410 (having been subjected by core(3) to processing at blocks 304 and 306) from core(3) via shared bus 108. To obtain external object data at block 318, core 104 may use external object read pointers associated with the FIFOs of the one or more of cores 104.

At block 319, vertex processing results for the external objects may be obtained from shared storage. For instance, in various implementations, block 319 may involve core 102 obtaining vertex processing results for the external objects (obtained at block 318) from shared storage 106 using interconnect 107. At block 320, rasterization of the external objects may be performed. For example, core 102 may use rasterization module 122 to rasterize external objects obtained by it's own. FIFO 118 and external objects obtained from the FIFOs of one or more of cores 104 using well-known rasterization techniques.

At block 321, dereferencing data may be provided to other cores over the shared bus. For example, in various implementations, block 321 may involve core 102 using dereferencing logic 123 to send dereferencing information to cores 104 over shared bus 108. The dereferencing information may inform the various cores that particular vertices have been rendered and that, therefore, corresponding vertex data may be erased from storage locations in shared storage 106.

At block 322, a determination may then be made as to whether process 300 shall continue. For instance, if a particular core has finished rasterizing all objects associated with it's target pixel regions, then process 300 may loop back to blocks 308/310 where processing as described above may be undertaken by another graphics core for objects associated with that core's target pixel regions. In this manner, blocks 308-321 may be undertaken by other cores of a multi-core GPU system permitting rasterization of a frame buffer in temporal order. As these results are consumed, the consumer rasterization pipeline transmits dereference information back over a parallel shared dereference bus to the graphics core that generated the vertex processing results.

While implementation of example process 300, as illustrated in FIGS. 3 and 5, may include the undertaking of all blocks shown in the order illustrated, the present disclosure is not limited in this regard and, in various examples, implementation of process 300 may include the undertaking only a subset of the blocks shown and/or in a different order than illustrated. For example, a core's rasterization module may transmit dereferencing information over the shared bus when vertex processing results are consumed at blocks 311/312 and 319/320 rather than waiting until block 321 to do so.

In addition, any one or more of the blocks of FIGS. 3 and 5 may be undertaken in response to instructions provided by one or more computer program products. Such program products may include signal bearing media providing instructions that, when executed by, for example, a processor, may provide the functionality described herein. The computer program products may be provided in any form of computer readable medium. Thus, for example, a processor including one or more processor core(s) may undertake one or more of the blocks shown in FIGS. 3 and 5 in response to instructions conveyed to the processor by a computer readable medium.

As used in any implementation described herein, the term "module" refers to any combination of software, firmware and/or hardware configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 6:
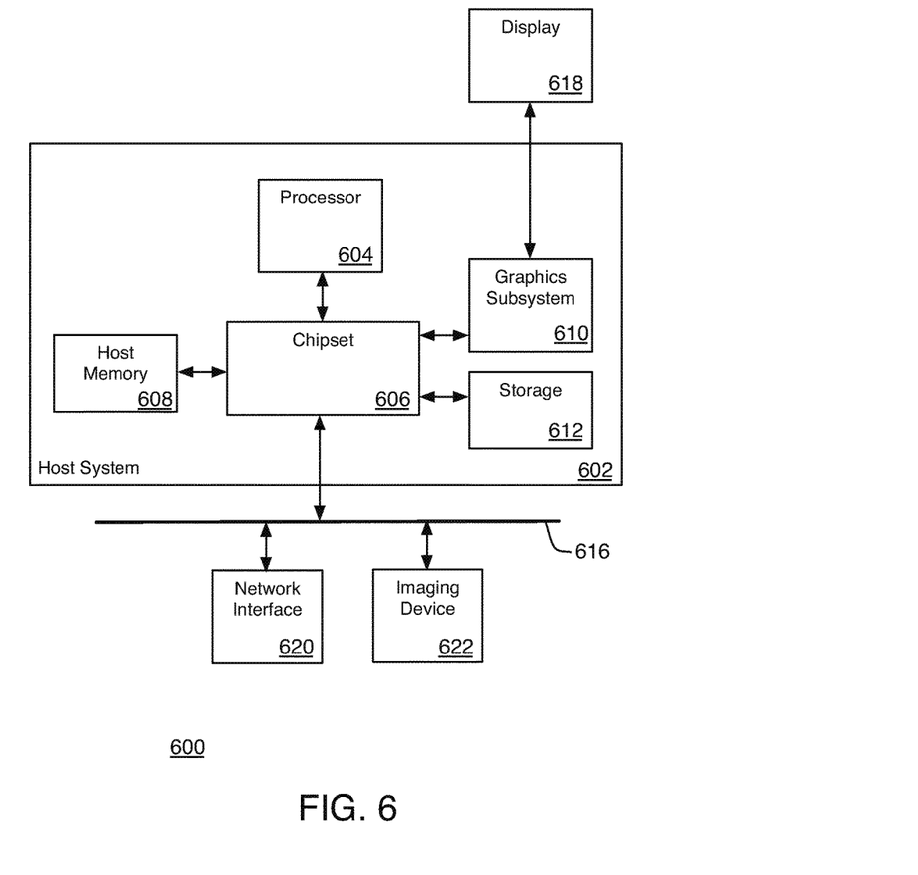
FIG. 6 is an illustrative diagram of an example system, all arranged in accordance with at least some implementations of the present disclosure.

FIG. 6 illustrates an example computing system 600 in accordance with the present disclosure. System 600 may be used to perform some or all of the various functions discussed herein and may include any device or collection of devices capable of undertaking processes described herein in accordance with various implementations of the present disclosure. For example, system 600 may include selected components of a computing platform or device such as a desktop, mobile or tablet computer, a smart phone, a set top box, etc., although the present disclosure is not limited in this regard. In some implementations, system 600 may include computing platform or SoC based on Intel® architecture (IA) in, for example, a CE device. It will be readily appreciated by one of skill in the art that the implementations described herein can be used with alternative processing systems without departure from the scope of the present disclosure.

Computer system 600 may include a host system 602, a bus 616, a display 618, a network interface 620, and an imaging device 622. Host system 602 may include a processor 604, a chipset 606, host memory 608, a graphics subsystem 610, and storage 612. Processor 604 may include one or more processor cores and may be any type of processor logic capable of executing software instructions and/or processing data signals. In various examples, processor 704 may include Complex Instruction Set Computer (CISC) processor cores, Reduced Instruction Set Computer (RISC) microprocessor cores, Very Long Instruction Word (VLIW) microprocessor cores, and/or any number of processor cores implementing any combination or types of instruction sets. In some implementations, processor 604 may be capable of digital signal processing and/or microcontroller processing.

Processor 604 may include decoder logic that may be used for decoding instructions received by, e.g., chipset 606 and/or a graphics subsystem 610, into control signals and/or microcode entry points. Further, in response to control signals and/or microcode entry points, chipset 606 and/or graphics subsystem 610 may perform corresponding operations. In various implementations, processor 604 may be configured to undertake any of the processes described herein including the example processes described with respect to FIGS. 3 and 5.

Chipset 606 may provide intercommunication among processor 604, host memory 608, storage 612, graphics subsystem 610, and bus 616. For example, chipset 606 may include a storage adapter (not depicted) capable of providing intercommunication with storage 612. For example, the storage adapter may be capable of communicating with storage 612 in conformance with any of a number of protocols, including, but not limited to, the Small Computer Systems Interface (SCSI), Fibre Channel (FC), and/or Serial Advanced Technology Attachment (S-ATA) protocols. In various implementations, chipset 606 may include logic capable of transferring information within host memory 608, or between network interface 620 and host memory 608, or in general between any set of components in system 600. In various implementations, chipset 606 may include more than one IC.

Host memory 608 may be implemented as a volatile memory device such as but not limited to a Random Access Memory (RAM), Dynamic Random Access Memory (DRAM), or Static RAM (SRAM) and so forth. Storage 612 may be implemented as a non-volatile storage device such as but not limited to a magnetic disk drive, optical disk drive, tape drive, an internal storage device, an attached storage device, flash memory, battery backed-up SDRAM (synchronous DRAM), and/or a network accessible storage device or the like.

Memory 608 may store instructions and/or data represented by data signals that may be executed by processor 604 in undertaking any of the processes described herein including the example process described with respect to FIGS. 3 and 5. For example, host memory 608 may store vertex processing results, target pixel regions and so forth. In some implementations, storage 612 may also store such items.

Graphics subsystem 610 may perform processing of images such as still or video images for display. For example, in some implementations, graphics subsystem 610 may perform 3D graphics processing. For example, graphics subsystem 610 may perform activities as described with regard to FIGS. 3 and 5. An analog or digital interface may be used to communicatively couple graphics subsystem 610 and display 618. For example, the interface may be any of a High-Definition Multimedia Interface, DisplayPort, wireless HDMI, and/or wireless HD compliant techniques. In various implementations, graphics subsystem 610 may be integrated into processor 604 or chipset 606. In some other implementations, graphics subsystem 610 may be a standalone card communicatively coupled to chipset 606.

Bus 616 may provide intercommunication among at least host system 602, network interface 620, imaging device 622 as well as other peripheral devices (not depicted) such as a keyboard, mouse, and the like. Bus 616 may support serial or parallel communications. Bus 616 may support node-to-node or node-to-multi-node communications. Bus 616 may at least be compatible with the Peripheral Component Interconnect (PCI) specification described for example at Peripheral Component Interconnect (PCI) Local Bus Specification, Revision 3.0, Feb. 2, 2004 available from the PCI Special Interest Group, Portland, Oreg., U.S.A. (as well as revisions thereof); PCI Express described in The PCI Express Base Specification of the PCI Special Interest Group, Revision 1.0a (as well as revisions thereof); PCI-x described in the PCI-X Specification Rev. 1.1, Mar. 28, 2005, available from the aforesaid PCI Special Interest Group, Portland, Oreg., U.S.A. (as well as revisions thereof); and/or Universal Serial Bus (USB) (and related standards) as well as other interconnection standards.

Network interface 620 may be capable of providing intercommunication between host system 602 and a network in compliance with any applicable protocols such as wired or wireless techniques. For example, network interface 620 may comply with any variety of IEEE communications standards such as 802.3, 802.11 or 802.16. Network interface 620 may intercommunicate with host system 602 using bus 616. In some implementations, network interface 620 may be integrated into chipset 606.

The 3D graphics processing techniques described herein may be implemented in various hardware architectures. For example, 3D graphics functionality may be integrated within a chipset. Alternatively, a discrete graphics processor may be used. As still another implementation, the 3D graphics functions may be implemented by a general purpose processor, including a multi-core processor. In a further implementation, the functions may be implemented in a consumer electronics device.

Display 618 may be any type of display device and/or panel. For example, display 618 may be a Liquid Crystal Display (LCD), a Plasma Display Panel (PDP), an Organic Light Emitting Diode (OLED) display, and so forth. In some implementations, display 618 may be a projection display (such as a pica projector display or the like), a micro display, etc. In various implementations, display 618 may be used to display images resulting from 3D graphics processing as described herein.

Imaging device 622 may be any type of imaging device such as a digital camera, cell phone camera, infra red (IR) camera, and the like. Imaging device 622 may include one or more image sensors (such as a Charge-Coupled Device (CCD) or Complimentary Metal-Oxide Semiconductor (CMOS) image sensor). Imaging device 622 may capture color or monochrome images. Imaging device 622 may capture input images (still or video) and provide those images, via bus 616 and chipset 606, to processor 604.

In some implementations, system 600 may communicate with various I/O devices not shown, in FIG. 6 via an I/O bus (also not shown). Such I/O devices may include but are not limited to, for example, a universal asynchronous receiver/transmitter (UART) device, a USB device, an I/O expansion interface or other I/O devices. In various implementations, system 600 may represent at least portions of a system for undertaking mobile, network and/or wireless communications.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

What is claimed:

1. An apparatus, comprising:
   a plurality of processor cores to perform three-dimensional (3D) graphics processing, each processor core including local storage to buffer geometry setup results, the plurality of processor cores comprising a first processor core and a second processor core;
   shared storage communicatively coupled to the plurality of processor cores, the shared storage to buffer vertex processing results provided by each processor core, wherein the first processor core is to write vertex processing results generated by the first processor core to the shared storage and to read vertex processing results generated by the second processor core from the shared storage for rasterization to be performed by the first processor core; and
   a bus communicatively coupled to the local storage of each processor core, the bus to distribute at least some of the geometry setup results among the plurality of processor cores,
   wherein each processor core includes a rasterization module including dereferencing logic, wherein the rasterization module to rasterize batches of objects in temporal round-robin order such that the rasterization module accesses the vertex processing results at the shared storage and facilitates the dereferencing logic to transmit dereference information based on the vertex processing results back over the bus to the plurality of processors, wherein a processor receives an allocated portion of the dereference information corresponding to a portion of the vertex processing results generated by the processor.

2. The apparatus of claim 1, wherein each processor core includes batching logic to apportion vertex processing workloads among the plurality of processor cores.

3. The apparatus of claim 2, further comprising an interconnect to provide the plurality of processor cores with shared access to the vertex processing results.

4. The apparatus of claim 1, wherein the local storage comprises a First In First Out (FIFO) buffer.

5. The apparatus of claim 4, wherein the FIFO buffer includes two sets of read pointers.

6. The apparatus of claim 5, wherein one set of read pointers is to reference objects spanning only target pixels of the processor core that includes the FIFO buffer, and wherein the other set of read pointers is to reference objects spanning target pixels of the processor core that includes the FIFO buffer and target pixels of at least one other processor core.

7. The apparatus of claim 4, wherein the FIFO buffer is to also buffer control information specifying apportioning of geometry setup results among the plurality of processor cores.

8. The apparatus of claim 1, wherein each processor core includes:
   a crossbar multiplexor communicatively coupled to the rasterization module and to the local storage, wherein the crossbar multiplexor is to select between internal objects sourced from the local storage and external objects sourced from other processor cores via the bus.

9. A computer-implemented method, comprising:
   distributing batches of geometric objects to a plurality of processor cores including a first processor core;
   at each processor core, performing vertex processing and geometry setup processing on a corresponding batch of geometric objects, storing results of the vertex processing in shared memory accessible to all processor cores, and storing results of the geometry setup processing in local storage; and
   at the first processor core, performing rasterization using geometry setup results obtained from local storage of the first processor core and from local storage of at least one of the other processor cores, wherein performing rasterization includes rasterizing the batches of geometric objects in temporal round-robin order such that the vertex processing results are accessed at the shared storage, and dereference information based on the vertex processing results is transmitted back over the bus to the plurality of processors, wherein a processor receives an allocated portion of the dereference information corresponding to a portion of the vertex processing results generated by the processor.

10. The method of claim 9, wherein the geometry setup results include internal object results and external object results, and wherein performing rasterization comprises:
    performing rasterization using internal object results obtained from the local storage, and using external object results obtained from the local storage structure of at least one of the other processor cores via a shared bus.

11. The method of claim 10, further comprising:
    outputting external object results on the shared bus; and
    signaling batch demarcation over the shared bus.

12. The method of claim 10, wherein internal object results comprise geometry setup results for geometric objects that span target pixels associated with the first processor core, and wherein external object results comprise geometry setup results for geometric objects that span target pixels associated with at least another one of the processor cores.

13. The method of claim 9, wherein the local storage comprises a First In First Out (FIFO) buffer.

14. The method of claim 9, further comprising:
    storing control information in the local storage, the control information specifying the distribution of the batches of geometric objects among the plurality of processor cores.

15. The method of claim 14, wherein the distribution of the batches of geometric objects among the plurality of processor cores comprises a CheckerBoard Rendering (CBR) scheme.

16. A non-transitory computer-readable medium having stored thereon executable programming instructions which, when executed by a computing device, cause the computing device to perform operations comprising:

distributing batches of geometric objects to a plurality of processor cores including a first processor core;

at each processor core, performing vertex processing and geometry setup processing on a corresponding batch of geometric objects, storing results of the vertex processing in shared memory accessible to all processor cores, and storing results of the geometry setup processing in local storage; and at the first processor core, performing rasterization using geometry setup results obtained from local storage of the first processor core and from local storage of at least one of the other processor cores, wherein performing rasterization includes rasterizing the batches of geometric objects in temporal round-robin order such that the vertex processing results are accessed at the shared storage, and dereference information based on the vertex processing results is transmitted back over the bus to the plurality of processors, wherein a processor receives an allocated portion of the dereference information corresponding to a portion of the vertex processing results generated by the processor.

17. The computer-readable medium of claim 16, wherein the geometry setup results include internal object results and external object results, and wherein performing rasterization comprises:

performing rasterization using internal object results obtained from the local storage, and using external object results obtained from the local storage structure of at least one of the other processor cores via a shared bus.

18. The computer-readable medium of claim 17, further comprising instructions that, if executed, result in:

outputting external object results on the shared bus; and
signaling batch demarcation over the shared bus.

19. The computer-readable medium of claim 17, wherein internal object results comprise geometry setup results for geometric objects that span target pixels associated with the first processor core, and wherein external object results comprise geometry setup results for geometric objects that span target pixels associated with at least another one of the processor cores.

20. The computer-readable medium of claim 16, wherein the local storage comprises a First In First Out (FIFO) buffer.

21. A graphics data processing system, comprising:

a plurality of processor cores to perform three-dimensional (3D) graphics processing, each processor core including local storage to buffer geometry setup results, the plurality of processor cores comprising a first processor core and a second processor core;

shared storage communicatively coupled to the plurality of processor cores, the shared storage to buffer vertex processing results provided by each processor core, wherein the first processor core is to write vertex processing results generated by the first processor core to the shared storage and to read vertex processing results generated by the second processor core from the shared storage for rasterization to be performed by the first processor core;

a bus communicatively coupled to the local storage of each processor core, the bus to distribute at least some of the geometry setup results among the plurality of processor cores, wherein each processor core includes a rasterization module including dereferencing logic, wherein the rasterization module to rasterize batches of objects in temporal round-robin order such that the rasterization module accesses the vertex processing results at the shared storage and facilitates the dereferencing logic to transmit dereference information based on the vertex processing results back over the bus to the plurality of processors, wherein a processor receives an allocated portion of the dereference information corresponding to a portion of the vertex processing results generated by the processor; and a display communicatively coupled to the plurality of processor cores, the display to images generated by the plurality of processor cores as a result of the 3D graphics processing.

22. The system of claim 21, wherein each processor core includes batching logic to apportion vertex processing workloads among the plurality of processor cores, and wherein the system further comprises an interconnect to provide the plurality of processor cores with shared access to the vertex processing results.

23. The system of claim 21, wherein the local storage comprises a First In First Out (FIFO) buffer having two sets of read pointers.

24. The system of claim 21, wherein each processor core includes dereferencing logic to send dereferencing information over the bus to other processor cores.

25. The system of claim 21, wherein each processor core includes:

a crossbar multiplexor communicatively coupled to the rasterization module and to the local storage, wherein the crossbar multiplexor is to select between internal objects sourced from the local storage and external objects sourced from other processor cores via the bus.

* * * * *